(12) United States Patent
Kamijo et al.

(10) Patent No.: US 7,289,266 B1
(45) Date of Patent: *Oct. 30, 2007

(54) POLARIZER, OPTICAL FILM, AND IMAGE DISPLAY

(75) Inventors: Takashi Kamijo, Ibaraki (JP); Minoru Miyatake, Ibaraki (JP); Kazunori Futamura, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 63 days.

This patent is subject to a terminal disclaimer.

(21) Appl. No.: 10/681,384

(22) Filed: Oct. 9, 2003

(30) Foreign Application Priority Data

| Oct. 8, 2002 | (JP) | ............................. 2002-294396 |
| Jul. 1, 2003 | (JP) | ............................. 2003-189191 |
| Sep. 22, 2003 | (JP) | ............................. 2003-329744 |

(51) Int. Cl.
*G02B 5/30* (2006.01)
*G02B 27/28* (2006.01)

(52) U.S. Cl. ................ 359/491; 359/492; 359/490

(58) Field of Classification Search ........ 359/490–492, 359/500; 349/194
See application file for complete search history.

(56) References Cited

U.S. PATENT DOCUMENTS

| 2,123,902 | A |   | 7/1938 | Land ................. 88/1 |
| 6,761,452 | B2 | * | 7/2004 | Moravec et al. ......... 351/177 |
| 2002/0084447 | A1 | * | 7/2002 | Taguchi et al. ......... 252/582 |
| 2003/0137633 | A1 | * | 7/2003 | Ito et al. ............ 349/194 |
| 2004/0265593 | A1 | * | 12/2004 | Kamijo et al. .......... 428/411.1 |

FOREIGN PATENT DOCUMENTS

| CA | 2248214 |   | 9/1997 |
| EP | 0 668 513 |   | 8/1995 |
| EP | 1 251 370 | A | 10/2002 |
| JP | 2-73309 | A | 3/1990 |
| JP | 7-104126 | A | 4/1995 |
| JP | 8-190017 | A | 7/1996 |
| JP | 9-274108 |   | 10/1997 |
| JP | 9-297204 |   | 11/1997 |
| JP | 11-326610 | A | 11/1999 |
| JP | 2000-506990 |   | 6/2000 |
| JP | 2000-227517 |   | 8/2000 |
| JP | 2001-296427 |   | 10/2001 |
| JP | 2001-296427 | A | 10/2001 |
| JP | 2002-6137 |   | 1/2002 |
| JP | 2002-189128 |   | 7/2002 |
| JP | 2002-207118 |   | 7/2002 |
| WO | WO97/32224 |   | 9/1997 |
| WO | WO 01/55753 |   | 8/2001 |

OTHER PUBLICATIONS

Office Action of corresponding Chinese patent application No. 200310120956.7. issued Feb. 10, 2006.

* cited by examiner

*Primary Examiner*—Stephone B. Allen
*Assistant Examiner*—Aline D. McNaull
(74) *Attorney, Agent, or Firm*—Westerman, Hattori, Daniels & Adrian LLP

(57) ABSTRACT

A polarizer including a film having a structure having a minute domain dispersed in a matrix formed of a translucent water-soluble resin including an iodine light absorbing material, provides a high polarization degree in short wavelength side. The polarizer has a high transmittance and a high polarization degree, and is able to control unevenness of the transmittance in the case of black display.

16 Claims, 3 Drawing Sheets

POLARIZER, OPTICAL FILM, AND IMAGE DISPLAY

CROSS REFERENCE TO RELATED APPLICATION

This application is based on the earlier invention by the present inventors described in Japanese patent applications filed in the Japanese Patent Office, respectively 2002-294396 filed on Oct. 8, 2002, 2003-189191 filed on Jul. 1, 2003 and 2003-329744 filed on Sep. 22, 2003.

BACKGROUND OF THE INVENTION

1. Field of the Invention

The present invention relates to a polarizer. This invention also relates to a polarizing plate and an optical film using the polarizer concerned. Furthermore, this invention relates to an image display, such as a liquid crystal display, an organic electroluminescence display, a CRT and a PDP using the polarizing plate and the optical film concerned.

2. Description of the Prior Art

Liquid crystal display are rapidly developing in market, such as in clocks and watches, cellular phones, PDAs, notebook-sized personal computers, and monitor for personal computers, DVD players, TVs, etc. In the liquid crystal display, visualization is realized based on a variation of polarization state by switching of a liquid crystal, where polarizers are used based on a display principle thereof. Particularly, usage for TV etc. increasingly requires display with high luminance and high contrast, polarizers having higher brightness (high transmittance) and higher contrast (high polarization degree) are being developed and introduced.

As polarizers, for example, since it has a high transmittance and a high polarization degree, polyvinyl alcohols having a structure in which iodine is absorbed and then stretched, that is, iodine based polarizers are widely used (for example, Japanese Patent Laid-Open No. 2001-296427). However, since the iodine based polarizers have relatively low polarization degrees in short wavelength side, they have problems in hue, such as blue omission in black display, and yellowing in white display, in short wavelength side.

Iodine based polarizers may easily give unevenness in a process of iodine absorption. Accordingly, there has been a problem that the unevenness is detected as unevenness in transmittance particularly in the case of black display, causing to decrease of visibility. For example, as methods for solving the problems, several methods have been proposed that an amount of absorption of iodine absorbed to the iodine based polarizer is increased and thereby a transmittance in the case of black display is set not higher than sensing limitations of human eyes, and that stretching processes generating little unevenness itself are adopted. However, the former method has a problem that it decreases a transmittance in the case of white display, while decreasing a transmittance of black display, and as a result darkens the display itself. And also, the latter method has a problem that it requires replacing a process itself, worsening productivity.

SUMMARY OF THE INVENTION

This invention aims at providing an iodine based polarizer having a high polarization degree in short wavelength side. Moreover, this invention aims at providing an iodine based polarizer having a high transmittance and a high polarization degree, and being able to control unevenness of the transmittance in the case of black display.

Besides, this invention aims at providing a polarizing plate and an optical film using the polarizer concerned. Furthermore, this invention aims at providing an image display using the polarizer, the polarizing plate, and the optical film concerned.

As a result of examination wholeheartedly performed by the present inventors that the above-mentioned subject should be solved, it was found out that the above-mentioned purpose might be attained using polarizers shown below, leading to completion of this invention.

That is, this invention relates to a polarizer comprising a film having a structure having a minute domain dispersed in a matrix formed of a translucent water-soluble resin including an iodine light absorbing material.

The minute domain of the above-mentioned polarizer is preferably formed by an oriented birefringent material. The above-mentioned birefringent material preferably shows liquid crystallinity at least in orientation processing step.

The above-mentioned polarizer of this invention has an iodine based polarizer formed by a translucent water-soluble resin and an iodine based light absorbing material as a matrix, and has dispersed minute domains in the above-mentioned matrix. Minute domains are preferably formed by oriented materials having birefringence, and particularly minute domains are formed preferably with materials showing liquid crystallinity. Thus, in addition to function of absorption dichroism by iodine based light absorbing materials, characteristics of having function of scattering anisotropy improve polarization performance according to synergistic effect of the two functions, and as a result a polarizer having both of transmittance and polarization degree, and excellent visibility may be provided.

Iodine based light absorbing material means chemical species comprising iodine and absorbs visible light, and it is thought that, in general, they are formed by interaction between translucent water-soluble resins (particularly polyvinyl alcohol based resins) and poly iodine ions ($I_3{-}$, $I_5{-}$, etc.). An iodine based light absorbing material is also called an iodine complex. It is thought that poly iodine ions are generated from iodine and iodide ions.

Scattering performance of anisotropic scattering originates in refractive index difference between matrixes and minute domains. For example, if materials forming minute domains are liquid crystalline materials, since they have higher wavelength dispersion of $\Delta n$ compared with translucent water-soluble resins as a matrix, a refractive index difference in scattering axis becomes larger in shorter wavelength side, and, as a result, it provides more amounts of scattering in shorter wavelength. Accordingly, an improving effect of large polarization performance is realized in shorter wavelengths, compensating a relative low level of polarization performance of an iodine based polarizer in a side of shorter wavelength, and thus a polarizer having high polarization and neutral hue may be realized.

In the above-mentioned polarizer, it is preferable that the minute domains have a birefringence of 0.02 or more. In materials used for minute domains, in the view point of gaining larger anisotropic scattering function, materials having the above-mentioned birefringence may be preferably used.

In the above-mentioned polarizer, in a refractive index difference between the birefringent material forming the minute domains and the translucent water-soluble resin in each optical axis direction, a refractive index difference ($\Delta n^1$) in direction of axis showing a maximum is 0.03 or more, and a refractive index difference ($\Delta n^2$) between the $\Delta n^1$ direction and a direction of axes of two directions perpendicular to the $\Delta n^1$ direction is 50% or less of the $\Delta n^1$ Control of the above-mentioned refractive index difference ($\Delta n^1$) and ($\Delta n^2$) in each optical axis direction into the above-mentioned range may provide a scattering anisotropic film having function being able to selectively scatter only linearly polarized light in the $\Delta n^1$ direction, as is submitted in U.S. Pat. No. 2,123,902 specification. That is, on one hand, having a large refractive index difference in the $\Delta n^1$ direction, it may scatter linearly polarized light, and on the other hand, having a small refractive index difference in the $\Delta n^2$ direction, it may transmit linearly polarized light. Moreover, refractive index differences ($\Delta n^2$) in the directions of axes of two directions perpendicular to the $\Delta n^1$ direction are preferably equal.

In order to obtain high scattering anisotropy, a refractive index difference ($\Delta n^1$) in a $\Delta n^1$ direction is set 0.03 or more, preferably 0.05 or more, and still preferably 0.10 or more. A refractive index difference ($\Delta n^2$) in two directions perpendicular to the $\Delta n^1$ direction is 50% or less of the above-mentioned $\Delta n^1$, and preferably 30% or less.

In iodine based light absorbing material in the above-mentioned polarizer, an absorption axis of the material concerned preferably is orientated in the $\Delta n^1$ direction.

The iodine based light absorbing material in a matrix is orientated so that an absorption axis of the material may become parallel to the above-mentioned $\Delta n^1$ direction, and thereby linearly polarized light in the $\Delta n^1$ direction as a scattering polarizing direction may be selectively absorbed. As a result, on one hand, a linearly polarized light component of incident light in a $\Delta n^2$ direction is not scattered or hardly absorbed by the iodine light absorbing material as in conventional iodine based polarizers without anisotropic scattering performance. On the other hand, a linearly polarized light component in the $\Delta n^1$ direction is scattered, and is absorbed by the iodine based light absorbing material. Usually, absorption is determined by an absorption coefficient and a thickness. In such a case, scattering of light greatly lengthens an optical path length compared with a case where scattering is not given. As a result, polarized component in the $\Delta n^1$ direction is more absorbed as compared with a case in conventional iodine based polarizers. That is, higher polarization degrees may be attained with same transmittances.

Descriptions for ideal models will, hereinafter, be given. Two main transmittances usually used for linear polarizer (a first main transmittance $k_1$ (a maximum transmission direction=linearly polarized light transmittance in a $\Delta n^2$ direction), a second main transmittance $k_2$ (a minimum transmission direction=linearly polarized light transmittance in a $\Delta n^1$ direction)) are, hereinafter, used to give discussion.

In commercially available iodine based polarizers, when iodine based light absorbing materials are oriented in one direction, a parallel transmittance and a polarization degree may be represented as follows, respectively:

parallel transmittance=$0.5 \times ((k_1)^2+(k_2)^2)$ and polarization degree=$(k_1-k_2)/(k_1+k_2)$.

On the other hand, when it is assumed that, in a polarizer of this invention, a polarized light in a $\Delta n^1$ direction is scattered backscattering strength to incident light strength is preferably 30% or less, and more preferably 20% or less.

As the above-mentioned polarizers, films manufactured by stretching may suitably be used.

In the above-mentioned polarizer, minute domains preferably have a length in a $\Delta n^2$ direction of 0.05 through 500 μm.

In order to scatter strongly linearly polarized light having a plane of vibration in a $\Delta n^1$ direction in wavelengths of visible light band, dispersed minute domains have a length controlled to 0.05 through 500 μm in a $\Delta n^2$ direction, and preferably controlled to 0.5 through 100 μm. When the length in the $\Delta n^2$ direction of the minute domains is too short compared with wavelengths, scattering may not fully provided. On the other hand, when the length in the $\Delta n^2$ direction of the minute domains is too long, there is a possibility that a problem of decrease in film strength or of liquid crystalline material forming minute domains not fully oriented in the minute domains may arise.

In the above-mentioned polarizer, iodine light absorbing materials having an absorption band at least in a wavelength range of 400 through 700 nm may be used.

In the above-mentioned polarizers, a transmittance to a linearly polarized light in a transmission direction is 80% or more, a haze value is 5% or less, and a haze value to a linearly polarized light in an absorption direction is 30% or more.

An iodine polarizer of this invention having the above-mentioned transmittance and haze value has a high transmittance and excellent visibility for linearly polarized light in a transmission direction, and has strong optical diffusibility for linearly polarized light in an absorption direction. Therefore, without sacrificing other optical properties and using a simple method, it may demonstrate a high transmittance and a high polarization degree, and may control unevenness of the transmittance in the case of black display.

As a polarizer of this invention, a polarizer is preferable that has as high as possible transmittance to linearly polarized light in a transmission direction, that is, linearly polarized light in a direction perpendicular to a direction of maximal absorption of the above-mentioned iodine based light absorbing material, and that has 80% or more of light transmittance when an optical intensity of incident linearly polarized light is set to 100. The light transmittance is preferably 85% or more, and still preferably 88% or more. Here, a light transmittance is equivalent to a value Y calculated from a spectral transmittance in 380 nm through 780 nm measured using a spectrophotometer with an integrating sphere based on CIE 1931 XYZ standard colorimetric system. In addition, since about 8% through 10% is reflected by an air interface on a front surface and rear surface of a polarizer, an ideal limit is a value in which a part for this surface reflection is deducted from 100%.

It is desirable that a polarizer does not scatter linearly polarized light in a transmission direction in the view point of obtaining clear visibility of a display image. Accordingly, the polarizer preferably has 5% or less of haze value to the linearly polarized light in the transmission direction, more preferably 3% or less, and still more preferably 1% or less. On the other hand, in the view point of covering unevenness by a local transmittance variation by scattering, a polarizer desirably scatters strongly linearly polarized light in a absorption direction, that is, linearly polarized light in a direction for a maximal absorption of the above-mentioned iodine based light absorbing material. Accordingly, a haze value to the linearly polarized light in the absorption direction is preferably 30% or more, more preferably 40% or more, and still more preferably 50% or more. In addition, the haze value here is measured based on JIS K 7136 (how to obtain a haze of plastics-transparent material).

The above-mentioned optical properties are obtained by compounding a function of scattering anisotropy with a function of an absorption dichroism of the polarizer. As is indicated in U.S. Pat. No. 2,123,902 specification, Japanese Patent Laid-Open No. 9-274108, and Japanese Patent Laid-Open No. 9-297204, same characteristics may probably be attained also in a way that a scattering anisotropic film having a function to selectively scatter only linearly polarized light, and a dichroism absorption type polarizer are superimposed in an axial arrangement so that an axis providing a greatest scattering and an axis providing a greatest absorption may be parallel to each other. These methods, however, require necessity for separate formation of a scattering anisotropic film, have a problem of precision in axial joint in case of superposition, and furthermore, a simple superposition method does not provide increase in effect of the above-mentioned optical path length of the polarized light absorbed as is expected, and as a result, the method cannot easily attain a high transmission and a high polarization degree.

Besides, this invention relates to a polarizing plate which having a transparent protection layer at least on one side of the above-mentioned polarizer.

Moreover, this invention relates to an optical film characterized by being laminated with at least one of the above-mentioned polarizer and the above-mentioned polarizing plate.

Furthermore, this invention relates to an image display characterized by using the above-mentioned polarizer, the above-mentioned polarizing plate, or the above-mentioned optical film.

DESCRIPTION OF THE PREFERRED EMBODIMENTS

Figure 1:
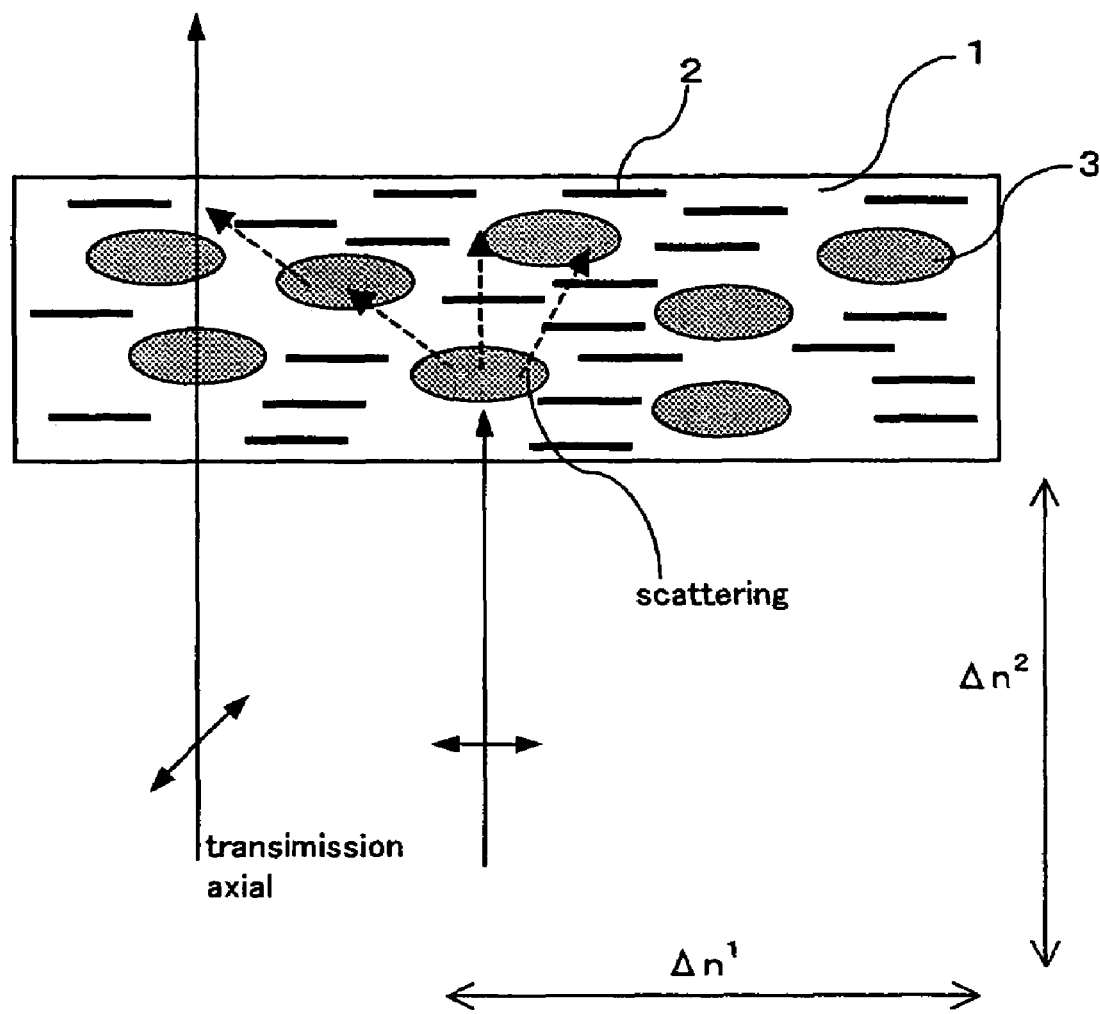
FIG. 1 is conceptual top view showing an example of a polarizer of this invention.

A polarizer of this invention will, hereinafter, be described referring to drawings. FIG. 1 is a conceptual top view of a polarizer of this invention, and the polarizer has a structure where a film is formed with a translucent water-soluble resin 1 including an iodine based light absorbing material 2, and minute domains 3 are dispersed in the film concerned as a matrix.

FIG. 1 shows an example of a case where the iodine based light absorbing material 2 is oriented in a direction of axis ($\Delta n^1$ direction) in which a refractive index difference between the minute domain 3 and the translucent water-soluble resin 1 shows a maximal value. In minute domain 3, a polarized component in the $\Delta n^1$ direction are scattered. In FIG. 1, the $\Delta n^1$ direction in one direction in a film plane is an absorption axis. In the film plane, a $\Delta n^2$ direction perpendicular to the $\Delta n^1$ direction serves as a transmission axis. Another $\Delta n^2$ direction perpendicular to the $\Delta n^1$ direction is a thickness direction.

As translucent water-soluble resins 1, resins having translucency in a visible light band and dispersing and absorbing the iodine based light absorbing materials may be used without particular limitation. For example, polyvinyl alcohols or derivatives thereof conventionally used for polarizers may be mentioned. As derivatives of polyvinyl alcohol, polyvinyl formals, polyvinyl acetals, etc. may be mentioned, and in addition derivatives modified with olefins, such as ethylene and propylene, and unsaturated carboxylic acids, such as acrylic acid, methacrylic acid, and crotonic acid, alkyl esters of unsaturated carboxylic acids, acrylamides etc. may be mentioned. Besides, as translucent water-soluble resin 1, for example, polyvinyl pyrrolidone based resins, amylose based resins, etc. may be mentioned. The above-mentioned translucent water-soluble resin may be of resins having isotropy not easily generating orientation birefringence caused by molding deformation etc., and of resins having anisotropy easily generating orientation birefringence.

In materials forming minute domains 3, it is not limited whether the material has birefringence or isotropy, but materials having birefringence is particularly preferable. Moreover, as materials having birefringence, materials (henceforth, referred to as liquid crystalline material) showing liquid crystallinity at least at the time of orientation treatment may preferably used. That is, the liquid crystalline material may show or may lose liquid crystallinity in the formed minute domain 3, as long as it shows liquid crystallinity at the orientation treatment time.

As materials forming minute domains 3, materials having birefringences (liquid crystalline materials) may be any of materials showing nematic liquid crystallinity, smectic liquid crystallinity, and cholesteric liquid crystallinity, or of materials showing lyotropic liquid crystallinity. Moreover, materials having birefringence may be of liquid crystalline thermoplastic resins, and may be formed by polymerization of liquid crystalline monomers. When the liquid crystalline material is of liquid crystalline thermoplastic resins, in the view point of heat-resistance of structures finally obtained, resins with high glass transition temperatures may be preferable. Furthermore, it is preferable to use materials showing glass state at least at room temperatures. Usually, a liquid crystalline thermoplastic resin is oriented by heating, subsequently cooled to be fixed, and forms minute domains 3 while liquid crystallinity are maintained. Although liquid crystalline monomers after orienting can form minute domains 3 in the state of fixed by polymerization, cross-linking, etc., some of the formed minute domains 3 may lose liquid crystallinity.

As the above-mentioned liquid crystalline thermoplastic resins, polymers having various skeletons of principal chain types, side chain types, or compounded types thereof may be used without particular limitation. As principal chain type liquid crystal polymers, polymers, such as condensed polymers having structures where mesogen groups including aromatic units etc. are combined, for example, polyester based, polyamide based, polycarbonate based, and polyester imide based polymers, may be mentioned. As the above-mentioned aromatic units used as mesogen groups, phenyl based, biphenyl based, and naphthalene based units may be mentioned, and the aromatic units may have substitutents, such as cyano groups, alkyl groups, alkoxy groups, and halogen groups.

As side chain type liquid crystal polymers, polymers having principal chain of, such as polyacrylate based, polymethacrylate based, poly-alpha-halo acrylate based, poly-alpha-halo cyano acrylate based, polyacrylamide based, polysiloxane based, and poly malonate based principal chain as a skeleton, and having mesogen groups including cyclic units etc. in side chains may be mentioned. As the above-mentioned cyclic units used as mesogen groups, biphenyl based, phenyl benzoate based, phenylcyclohexane based, azoxybenzene based, azomethine based, azobenzene based, phenyl pyrimidine based, diphenyl acetylene based, diphenyl benzoate based, bicyclo hexane based, cyclohexylbenzene based, terphenyl based units, etc. may be mentioned. Terminal groups of these cyclic units may have substitutents, such as cyano group, alkyl group, alkenyl group, alkoxy group, halogen group, haloalkyl group, haloalkoxy group, and haloalkenyl group. Groups having halogen groups may be used for phenyl groups of mesogen groups.

Besides, any mesogen groups of the liquid crystal polymer may be bonded via a spacer part giving flexibility. As spacer parts, polymethylene chain, polyoxymethylene chain, etc. may be mentioned. A number of repetitions of structural units forming the spacer parts is suitably determined by chemical structure of mesogen parts, and the number of repeating units of polymethylene chain is 0 through 20, preferably 2 through 12, and the number of repeating units of polyoxymethylene chain is 0 through 10, and preferably 1 through 3.

The above-mentioned liquid crystalline thermoplastic resins preferably have glass transition temperatures of 50° C. or more, and more preferably 80° C. or more. Furthermore they have approximately 2,000 through 100,000 of weight average molecular weight.

As liquid crystalline monomers, monomers having polymerizable functional groups, such as acryloyl groups and methacryloyl groups, at terminal groups, and further having mesogen groups and spacer parts including the above-mentioned cyclic units etc. may be mentioned. Crossed-linked structures may be introduced using polymerizable functional groups having two or more acryloyl groups, methacryloyl groups, etc., and durability may also be improved.

Materials forming minute domains 3 are not entirely limited to the above-mentioned liquid crystalline materials, and non-liquid crystalline resins may be used if they are different materials from the matrix materials. As the above-mentioned resins, polyvinyl alcohols and derivatives thereof, polyolefins, polyallylates, polymethacrylates, polyacrylamides, polyethylene terephthalates, acrylic styrene copolymes, etc. may be mentioned. Moreover, particles without birefringence may be used as materials for forming the minute domains 3. As fine-particles concerned, resins, such as polyacrylates and acrylic styrene copolymers, may be mentioned. A size of the fine-particles is not especially limited, and particle diameters of 0.05 through 500 µm may be used, and preferably 0.5 through 100 µm. Although it is preferable that materials for forming minute domains 3 is of the above-mentioned liquid crystalline materials, non-liquid crystalline materials may be mixed and used to the above-mentioned liquid crystalline materials. Furthermore, as materials for forming minute domains 3, non-liquid crystalline materials may also be independently used.

In a polarizer of this invention, while producing a film in which a matrix is formed with a translucent water-soluble resin 1 including an iodine based light absorbing material 2, minute domains 3 (for example, an oriented birefringent material formed with liquid crystalline materials) are dispersed in the matrix concerned. Moreover, the above-mentioned refractive index difference ($\Delta n^1$) in a $\Delta n^1$ direction and a refractive index difference ($\Delta n^2$) in a $\Delta n^2$ direction are controlled to be in the above-mentioned range in the film.

Manufacturing process of a polarizer of this invention is not especially limited, and for example, the polarizer of this invention may be obtained using following production processes:

(1) a process for manufacturing a mixed solution in which a material for forming minute domains is dispersed in a translucent water-soluble resin forming a matrix (description is, hereinafter, to be provided, with reference to an example of representation, for a case where a liquid crystalline material is used as a material forming the minute domains. A case by a liquid crystalline material will apply to a case by other materials.);

(2) a process in which a film is formed with the mixed solution of the above-mentioned (1);

(3) a process in which the film obtained in the above-mentioned (2) is oriented (stretched); and (4) a process in which an iodine based light absorbing material is dispersed (dyed) in the translucent water-soluble resin forming the above-mentioned matrix.

In addition, an order of the processes (1) to (4) may suitably be determined.

In the above-mentioned process (1), a mixed solution is firstly prepared in which a liquid crystalline material forming minute domains is dispersed in a translucent water-soluble resin forming a matrix. A method for preparing the mixed solution concerned is not especially limited, and a method may be mentioned of utilizing a phase separation phenomenon between the above-mentioned matrix component (a translucent water-soluble resin) and a liquid crystalline material. For example, a method may be mentioned in which a material having poor compatibility between the matrix component as a liquid crystalline material is selected, a solution of the material forming the liquid crystalline material is dispersed using dispersing agents, such as a surface active agent, in a water solution of the matrix component. In preparation of the above-mentioned mixed solution, some of combinations of the translucent material forming the matrix, and the liquid crystal material forming minute domains do not require a dispersing agent. An amount used of the liquid crystalline material dispersed in the matrix is not especially limited, and a liquid crystalline material is 0.01 through 100 part(s) by weight to a translucent water-soluble resin 100 parts by weight, and preferably it is 0.1 through 10 part(s) by weight. The liquid crystalline material is used in a state dissolved or not dissolved in a solvent. Examples of solvents, for example, include: water, toluene, xylene, hexane cyclohexane, dichloromethane, trichloromethane, dichloroethane, trichloroethane, tetrachloroethane, trichloroethylene, methyl ethyl ketone, methylisobutylketone, cyclohexanone, cyclopentanone, tetrahydrofuran, ethyl acetate, etc. Solvents for the matrix components and solvents for the liquid crystalline materials may be of same, or may be of different solvents.

In the above-mentioned process (2), in order to reduce foaming in a drying process after a film formation, it is desirable that solvents for dissolving the liquid crystalline material forming a minute domains is not used in preparation of the mixed solution in the process (1). When solvents are not used, for example, a method may be mentioned in which a liquid crystalline material is directly added to an aqueous solution of a translucency material forming a matrix, and then is heated above a liquid crystal temperature range in order to disperse the liquid crystalline material uniformly in a smaller state.

In addition, a solution of a matrix component, a solution of a liquid crystalline material, or a mixed solution may include various kinds of additives, such as dispersing agents, surface active agents, ultraviolet absorption agents, flame retardants, antioxidants, plasticizers, mold lubricants, other lubricants, and colorants in a range not disturbing an object of this invention.

In the process (2) for obtaining a film of the above-mentioned mixed solution, the above-mentioned mixed solution is heated and dried to remove solvents, and thus a film with minute domains dispersed in the matrix is produced. As methods for formation of the film, various kinds of methods, such as casting methods, extrusion methods, injection molding methods, roll molding methods, and flow casting molding methods, may be adopted. In film molding, a size of minute domains in the film is controlled to be in a range of 0.05 through 500 μm in a $\Delta n^2$ direction. Sizes and dispersibility of the minute domains may be controlled, by adjusting a viscosity of the mixed solution, selection and combination of the solvent of the mixed solution, dispersant, and thermal processes (cooling rate) of the mixed solvent and a rate of drying. For example, a mixed solution of a translucent water-soluble resin that has a high viscosity and generates high shearing force and that forms a matrix, and a liquid crystalline material forming minute domains is dispersed by agitators, such as a homogeneous mixer, being heated at a temperature in no less than a range of a liquid crystal temperature, and thereby minute domains may be dispersed in a smaller state.

The process (3) giving orientation to the above-mentioned film may be performed by stretching the film. In stretching, uniaxial stretching, biaxial stretching, diagonal stretching are exemplified, but uniaxial stretching is usually performed. Any of dries type stretching in air and wet type stretching in an aqueous system bath may be adopted as the stretching method. When adopting a wet type stretching, an aqueous system bath may include suitable additives (boron compounds, such as boric acid; iodide of alkali metal, etc.) A stretching ratio is not especially limited, and in usual a ratio of approximately 2 through 10 times is preferably adopted.

This stretching may orient the iodine based light absorbing material in a direction of stretching axis. Moreover, the liquid crystalline material forming a birefringent material is oriented in the stretching direction in minute domains by the above-mentioned stretching, and as a result birefringence is demonstrated.

It is desirable the minute domains may be deformed according to stretching. When minute domains are of non-liquid crystalline materials, approximate temperatures of glass transition temperatures of the resins are desirably selected as stretching temperatures, and when the minute domains are of liquid crystalline materials, temperatures making the liquid crystalline materials exist in a liquid crystal state such as nematic phase or smectic phase or an isotropic phase state, are desirably selected as stretching temperatures. When inadequate orientation is given by stretching process, processes, such as heating orientation treatment, may separately be added.

In addition to the above-mentioned stretching, function of external fields, such as electric field and magnetic field, may be used for orientation of the liquid crystalline material. Moreover, liquid crystalline materials mixed with light reactive substances, such as azobenzene, and liquid crystalline materials having light reactive groups, such as a cinnamoyl group, introduced thereto are used, and thereby these materials may be oriented by orientation processing with light irradiation etc. Furthermore, a stretching processing and the above-mentioned orientation processing may also be used in combination. When the liquid crystalline material is of liquid crystalline thermoplastic resins, it is oriented at the time of stretching, cooled at room temperatures, and thereby orientation is fixed and stabilized. Since target optical property will be demonstrated if orientation is carried out, the liquid crystalline monomer may not necessarily be in a cured state. However, in liquid crystalline monomers having low isotropic transition temperatures, a few temperature rise provides an isotropic state. In such a case, since anisotropic scattering may not be demonstrated but conversely polarized light performance deteriorates, the liquid crystalline monomers are preferably cured. Besides, many of liquid crystalline monomers will be crystallized when left at room temperatures, and then they will demonstrate anisotropic scattering and polarized light performance conversely deteriorate, the liquid crystalline monomers are preferably cured. In the view point of these phenomena, in order to make orientation state stably exist under any kind of conditions, liquid crystalline monomers are preferably cured. In curing of a liquid crystalline monomer, for example, after the liquid crystalline monomer is mixed with photopolymerization initiators, dispersed in a solution of a matrix component and oriented, in either of timing (before dyed or after dyed by iodine based light absorbing materials), the liquid crystalline monomer is cured by exposure with ultraviolet radiation etc. to stabilize orientation. Desirably, the liquid crystalline monomer is cured before dyed with iodine based light absorbing materials.

As a process (4) in which the iodine based light absorbing material is dispersed in the translucent water-soluble resin used for forming the above-mentioned matrix, in general, a method in which the above-mentioned film is immersed into a bath of aqueous system including iodine dissolved with auxiliary agents of iodide of alkali metals, such as potassium iodide may be mentioned. As mentioned above, an iodine based light absorbing material is formed by interaction between iodine dispersed in the matrix and the matrix resin. Timing of immersing may be before or after the above-mentioned stretching process (3). The iodine based light absorbing material is, in general, remarkably formed by being passed through a stretching process. A concentration of the aqueous system bath including iodine, and a percentage of the auxiliary agents, such as iodide of alkali metals may not especially be limited, but general iodine dyeing techniques may be adopted, and the above-mentioned concentration etc. may arbitrarily be changed.

Moreover, a percentage of the iodine in the polarizer obtained is not especially limited, but a percentage of the translucent water-soluble resin and the iodine is preferably controlled to be 0.05 through 50 part(s) by weight grade to the translucent water-soluble resin 100 parts by weight, and more preferably 0.1 through 10 parts(s) by weight.

In production of the polarizer, processes for various purposes (5) may be given other than the above-mentioned processes (1) through (4). As a process (5), for example, a process in which a film is immersed in water bath and swollen may be mentioned for the purpose of mainly improving iodine dyeing efficiency of the film. Besides, a process in which a film is immersed in a water bath including arbitrary additives dissolved therein may be mentioned. A process in which a film is immersed in an aqueous solution including additives, such as boric acid and borax, for the purpose of cross-linking a water-soluble resin (matrix) may be mentioned. Moreover, for the purpose of mainly adjusting an amount balance of the dispersed iodine based light absorbing materials, and adjusting a hue, a process in which a film is immersed to an aqueous solution including additives, such as an iodide of an alkaline metals may be mentioned.

As for the process (3) of orienting (stretching) of the above-mentioned film, the process (4) of dispersing and dyeing the iodine based light absorbing material to a matrix resin and the above-mentioned process (5), so long as each of the processes (3) and (4) is provided at least 1 time, respectively, a number, order and conditions (a bath temperature, immersion period of time, etc.) of the processes, may arbitrarily be selected, each process may separately be performed and furthermore a plurality of processes may simultaneously be performed. For example, a cross-linking process of the process (5) and the stretching process (3) may be carried out simultaneously.

In addition, although the iodine based light absorbing material used for dyeing, boric acid used for cross-linking are permeated into a film by immersing the film in an aqueous solution as mentioned above, instead of this method, a method may be adopted that arbitrary types and amounts may be added before film formation of the process (2) and before or after preparation of a mixed solution in the process (1). And both methods may be used in combination. However, when high temperatures (for example, no less than 80° C.) is required in the process (3) at the time of stretching etc., in the view point of heat resistance of the iodine based light absorbing material, the process (4) for dispersing and dyeing the iodine based light absorbing material may be desirably performed after the process (3).

A film given the above treatments is desirably dried using suitable conditions. Drying is performed according to conventional methods.

A thickness of the obtained polarizer (film) is not especially limited, in general, but it is 1 µm through 3 mm, preferably 5 µm through 1 mm, and more preferably 10 through 500 µm.

A polarizer obtained in this way does not especially have a relationship in size between a refractive index of the birefringent material forming minute domains and a refractive index of the matrix resin in a stretching direction, whose stretching direction is in a $\Delta n^1$ direction and two directions perpendicular to a stretching axis are $\Delta n^2$ directions. Moreover, the stretching direction of an iodine based light absorbing material is in a direction demonstrating maximal absorption, and thus a polarizer having a maximally demonstrated effect of absorption and scattering may be realized.

Since a polarizer obtained by this invention has equivalent functions as in existing absorbed type polarizing plates, it may be used in various applicable fields where absorbed type polarizing plates are used without any change.

The above-described polarizer may be used as a polarizing plate with a transparent protective layer prepared at least on one side thereof using a usual method. The transparent protective layer may be prepared as an application layer by polymers, or a laminated layer of films. Proper transparent materials may be used as a transparent polymer or a film material that forms the transparent protective layer, and the material having outstanding transparency, mechanical strength, heat stability and outstanding moisture interception property, etc. may be preferably used. As materials of the above-mentioned protective layer, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Films made of heat curing type or ultraviolet ray curing type resins, such as acryl based, urethane based, acryl urethane based, epoxy based, and silicone based, etc. may be mentioned.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

As a transparent protection film, if polarization property and durability are taken into consideration, cellulose based polymer, such as triacetyl cellulose, is preferable, and especially triacetyl cellulose film is suitable. In general, a thickness of a transparent protection film is 500 µm or less, preferably 1 through 300 µm, and especially preferably 5 through 300 µm. In addition, when transparent protection films are provided on both sides of the polarizer, transparent protection films comprising same polymer material may be used on both of a front side and a back side, and transparent protection films comprising different polymer materials etc. may be used.

Moreover, it is preferable that the transparent protection film may have as little coloring as possible. Accordingly, a protection film having a phase difference value in a film thickness direction represented by $Rth=[(nx+ny)/2-nz] \times d$ of −90 nm through +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protection film may mostly be cancelled using a protection film having a phase difference value (Rth) of −90 nm through +75 nm in a thickness direction. The phase difference value (Rth) in a thickness direction is preferably −80 nm through +60 nm, and especially preferably −70 nm through +45 nm.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

Adhesives are used for adhesion processing of the above described polarizing film and the transparent protective film. As adhesives, isocyanate derived adhesives, polyvinyl alcohol derived adhesives, gelatin derived adhesives, vinyl polymers derived latex type, aqueous polyesters derived adhesives, etc. may be mentioned. The above-described adhesives are usually used as adhesives comprising aqueous solution, and usually contain solid of 0.5 to 60% by weight.

A polarizing plate of the present invention is manufactured by adhering the above described transparent protective film and the polarizing film using the above described adhesives. The application of adhesives may be performed to any of the transparent protective film or the polarizing film, and may be performed to both of them. After adhered, drying process is given and the adhesion layer comprising applied dry layer is formed. Adhering process of the polarizing film and the transparent protective film may be performed using a roll laminator etc. Although a thickness of the adhesion layer is not especially limited, it is usually approximately 0.1 to 5 μm.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflector, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be mentioned. A retardation plate may be a retardation plate that has a proper phase difference according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal bidirectional stretching and a bidirectionally stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported (PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light band, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light band, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants.

Moreover, it may be an adhesive layer that contains fine particle and shows optical diffusion nature.

Proper method may be carried out to attach an adhesive layer to one side or both sides of the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which an adhesive layer is once formed on a separator, as mentioned above, and is then transferred on a polarizing plate or an optical film may be mentioned.

An adhesive layer may also be prepared on one side or both sides of a polarizing plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarizing plate or an optical film. Thickness of an adhesive layer may be suitably determined depending on a purpose of usage or adhesive strength, etc., and generally is 1 to 500 µm, preferably 5 to 200 µm, and more preferably 10 to 100 µm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflector is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, an organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Examples of this invention will, hereinafter, be shown, and specific descriptions will be provided. In addition, "part(s)" in following sections represents part(s) by weight.

Example 1

A liquid crystalline monomer having acryloyl groups at both of terminal groups of a mesogen group (nematic liquid crystal temperature range: 60 through 125° C.) and a surface active agent (manufactured by Kao Corporation, EMASOL L10) were blended by a weight ratio of 30:1 to prepare a tetrahydrofuran solution having 30% by weight of solid content. A polyvinyl alcohol aqueous solution having a polyvinyl alcohol resin with a 2400 of degree of polymerization and a 98.5% of degrees of saponification dissolved therein and having 13% by weight of solid content, and the above-mentioned tetrahydrofuran solution were mixed so as to give (polyvinyl alcohol):(liquid crystalline monomer) =100:3 (weight ratio), and they were agitated with a homogeneous mixer to obtain a mixed solution. Then, after the mixed solution concerned was held for 30 minutes at 90° C. to vaporize tetrahydrofuran off and cooled at room temperature (23° C.), the mixed solution was coated using a casting method, subsequently dried to obtain a cloudy film with a thickness of 70 μm. This film was uniaxially stretched by 3 times at 110° C. to obtain a stretched film (the stretched film produced at this time is referred to as Film A).

Film A has scattering anisotropy, and when a polarized light with a plane of vibration parallel to a stretching direction enters, the light was scattered, and on the other side, when a polarized light with a plane of vibration perpendicular to the direction entered, the light was not scattered. When the film A was observed with a polarization microscope, it was identified that countless minute domains of a liquid crystalline monomer dispersed in a polyvinyl alcohol matrix were formed. This liquid crystalline monomer was oriented in a stretching direction, and it had an average size of the minute domains of 5 through 10 μm in the stretching direction ($\Delta n^2$ direction).

Refractive indexes of the matrix and of the minute domains were separately measured respectively. Measurement was performed at 20° C. First, an independent refractive index of the polyvinyl alcohol film stretched by a same stretching condition (stretched 3 times at 110° C.) was measured using an Abbe refractometer (measurement light: 589 nm) to obtain a refractive index=1.54 in the stretching direction ($\Delta n^1$ direction), and a refractive index of $\Delta n^2$ direction=1.52. Moreover, the liquid crystalline monomer was measured for refractive indexes ($n_e$: extraordinary refractive index, and $n_o$: ordinary refractive index). The liquid crystalline monomer oriented and coated on a high refractive index glass to which perpendicular orientation processing was given was measured for $n_o$ using an Abbe refractometer (measurement light: 589 nm). On the other hand, the liquid crystalline monomer was introduced into a liquid crystal cell to which horizontal orientation processing was given, a retardation ($\Delta n \times d$) was measured using an automatic birefringence measuring apparatus (manufactured by Oji Scientific Instruments, automatic birefringence meter KOBRA 21 ADH), a cell gap (d) was separately measured using an optical interference method, and then $\Delta n$ was calculated from the phase difference/cell gap. This sum of $\Delta n$ and $n_o$ was defined as $n_e$. A value $n_e$ (equivalent to a refractive index in a $\Delta n^1$ direction)=1.654 and $n_o$ (equivalent to a refractive index in a $\Delta n^2$ direction)=1.523 were obtained. Therefore, calculated results of $\Delta n^1$=1.654− 1.54=0.114, $\Delta n^2$=1.523−1.52=0.003 were obtained.

Then, Film A was sequentially immersed in each of following baths. That is, (a) swelling was performed in a water bath at 30° C.;

(b) dyeing was performed at 30° C. in an aqueous solution (0.32% by weight of concentration) in which iodine:potassium iodide=1:7 (weight ratio) were dissolved; (c) cross-linking was performed in an aqueous solution bath of 3% by weight boric acid; and (d) hue adjustment was performed at 30° C. in an aqueous solution bath of potassium iodide of 3% by weight, and thereby a polarizer of this invention was obtained.

Comparative Example 1

Except that the tetrahydrofuran solution including the liquid crystalline monomer was not mixed with the polyvinyl alcohol aqueous solution in Example 1, and the polyvinyl alcohol aqueous solution was independently used, a same method as in Example 1 was repeated to produce a film. A same stretching as in Example 1 was provided to the film to produce a stretched film. In addition, the obtained stretched film was dyed as in Example 1 using completely same processes as (a) through (d), and polarizer was obtained.

Example 2

Except that the polyvinyl alcohol aqueous solution and the tetrahydrofuran solution were mixed so as to be polyvinyl alcohol:liquid crystalline monomer=100:10 (weight ratio), a same method as in Example 1 was repeated to obtain a mixed solution. And except for having used the mixed solution concerned, a same method as in Example 1 was repeated to obtain a stretched film.

The stretched film had scattering anisotropy as in Example 1, when a polarized light with a plane of vibration parallel to a stretching direction enters, the light was scattered, and on the other side, when a polarized light with a plane of vibration perpendicular to the direction entered, the light was not scattered. When the stretched film was observed with a polarization microscope, it was identified that countless minute domains of a liquid crystalline monomer dispersed in a polyvinyl alcohol matrix were formed. This liquid crystalline monomer was oriented in a stretching direction, and it had an average size of the minute domains of 3 through 5 μm in the stretching direction ($\Delta n^2$ direction). Subsequently, the stretched film was sequentially immersed in each of baths of (a) through (d) as in Example 1, iodine dyeing was performed to obtain a polarizer of this invention.

Example 3

A polyvinyl alcohol aqueous solution of 13% by weight of solid content in which a polyvinyl alcohol resin having a degree of polymerization of 2400 and a 98.5% of a degrees of saponification were dissolved; a liquid crystalline monomer (nematic liquid crystal temperature range is 40 through 70° C.) having acryloyl groups at each terminal of both of a mesogen group; and glycerin were mixed so as to be polyvinyl alcohol:liquid crystalline monomer:glycerin=100:3:15 (weight ratio), and the mixture was heated more than a liquid crystal temperature range, and was agitated with a homogeneous mixer to obtain a mixed solution. After degassing of bubbles existing in the mixed solution concerned by left to stand at room temperature (23° C.), the mixed solution was coated by a casting method, and a cloudy mixed film having a thickness of 70 μm was obtained after drying. The mixed film was heat-treated for 10 minutes at 130° C.

Each of following processes was given to the above-mentioned mixed film, and stretched in a wet state: (a) the film was immersed in 30° C. water bath, swelled and stretched to 3 times; (b) it was immersed and dyed in an aqueous solution (0.32% by weight of concentration) of iodine:potassium iodide=1:7 (weight ratio) at 30° C.; (c) the film was immersed in an aqueous solution of boric acid of 3% by weight at 30° C., and cross-linked; (d) furthermore, the film was immersed in an aqueous solution of boric acid of 4% by weight at 60° C., and stretched twice (total stretching to 6 times); and (e) the obtained film was immersed in an aqueous solution bath of potassium iodide of 5% by weight at 30° C., and hue adjustment was given. Then, it was dried for 4 minutes at 50° C., and a polarizer of this invention was obtained.

(Identification of Anisotropic Scattering Expression, and Measurement of Refractive Index)

The above-mentioned mixed film was stretched on same conditions as in the above-mentioned wet type stretching except for using only water as an aqueous solution in the process (b) (with no dyeing). It was confirmed that desired scattering anisotropy was demonstrated by the stretched film obtained as in Example 1. Therefore, it was identified that the above-mentioned polarizer served as a desired polarizer in which both of absorption anisotropy and scattering anisotropy were demonstrated.

When the polarizer obtained was observed with a polarization microscope, it was identified that countless minute domains of a liquid crystalline monomer dispersed in a polyvinyl alcohol matrix were formed. This liquid crystalline monomer was oriented in a stretching direction, and it had an average size of the minute domains of 1 through 3 μm in the stretching direction ($\Delta n^2$ direction).

Refractive indexes of the matrix and the minute domains were separately measured respectively. Measurement of refractive index was performed by a same method as in Example 1. Firstly, except for using only water as an aqueous solution in the process (b) (with no dyeing), stretching was performed on same conditions as in the above-mentioned wet type stretching to obtain an independently stretched film of polyvinyl alcohol film. The film was measured for refractive indexes with Abbe refractometer (measurement light: 589 nm) to obtain a refractive index in the stretching direction ($\Delta n^1$ direction)=1.54 and a refractive index in the $\Delta n^2$ direction=1.52. Moreover, the liquid crystalline monomer was measured for refractive indexes ($n_e$: extraordinary index, and $n_o$: ordinary index) to obtain $n_e$ (equivalent to a refractive index in the $\Delta n^1$ direction)=1.66 and $n_o$ (equivalent to a refractive index in the $\Delta n^2$ direction)=1.53. Therefore, calculated results of $\Delta n^1$=1.66−1.54=0.12 and $\Delta n^2$=1.53−1.52=0.01 were obtained. It was identified that desired anisotropic scattering was demonstrated from the above results.

Example 4

Except that fine-particles with globular form (mean diameter of 2 μm) of acrylic styrene with refractive index 1.51 were used instead of the liquid crystalline monomer in Example 3 and mixed so that polyvinyl alcohol:fine-particles with globular form=100:2 (weight ratio), same method as in Example 3 was repeated to obtain a mixed solution. Moreover, a same method as in Example 3 was repeated using the mixed solution concerned to produce a mixed film. In addition, same method as in Example 3 was repeated on the mixed film obtained, and completely same wet type stretching as by (a) through (e) was given to obtain a polarizer. $\Delta n^1$=0.03 (=1.54−1.51), and $\Delta n^2$=0.01 (=1.52−1.51). As a result, it has confirmed that desired anisotropic scattering was demonstrated.

Comparative Example 2

Same operations as in Example 3 were repeated except for a film being produced in Example 3 using the polyvinyl alcohol aqueous solution itself. In addition, same method as in Example 3 was repeated on the mixed film obtained, and completely same wet type stretching as by (a) through (e) was given to obtain a polarizer.

(Evaluation)

Polarizers (sample) obtained in Examples and Comparative examples were measured for optical properties using a spectrophotometer with integrating sphere (manufactured by Hitachi Ltd. U-4100). Transmittance to each linearly polarized light was measured under conditions in which a completely polarized light obtained through Glan Thompson prism polarizer was set as 100%. Transmittance was calculated based on CIE 1931 standard colorimetric system, and is shown with Y value, for which relative spectral responsivity correction was carried out. Notation $k_1$ represents a transmittance of a linearly polarized light in a maximum transmittance direction, and $k_2$ represents a transmittance of a linearly polarized light perpendicular to the direction.

A polarization degree P was calculated with an equation $P=\{(k_1-k_2)/(k_1+k_2)\}\times 100$. A transmittance T of a simple substance was calculated with an equation $T=(k_1+k_2)/2$.

Figure 2A:
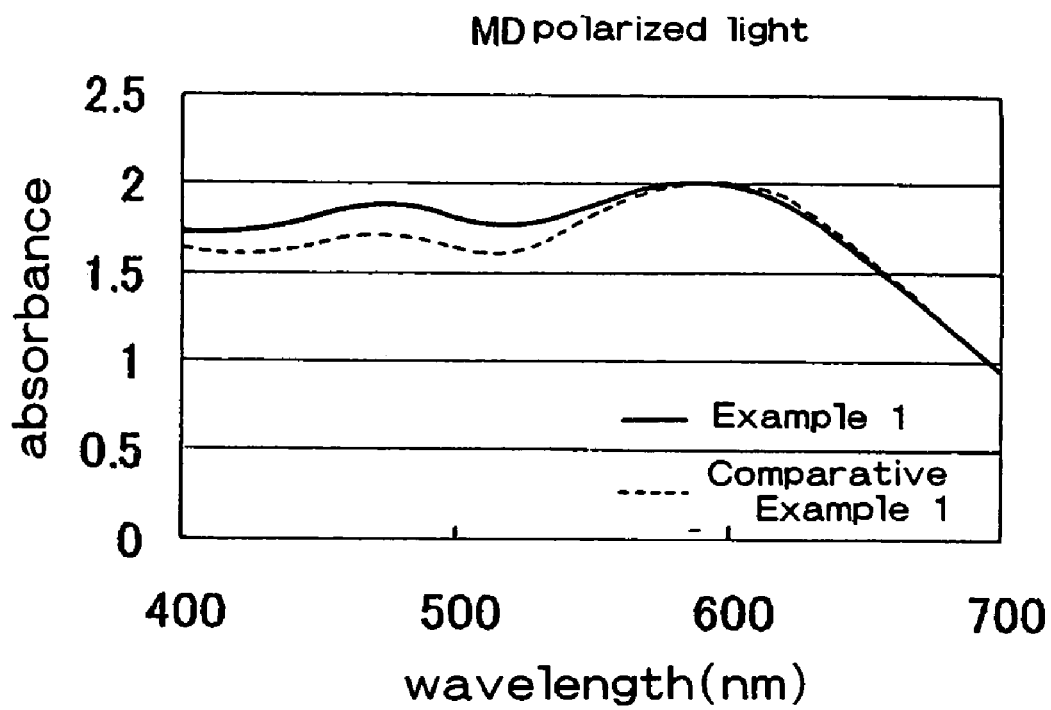
FIG. 2A and FIG. 2B are graphs showing polarized light absorption spectra of polarizers in Example 1 and Comparative example 1.
Figure 2B:
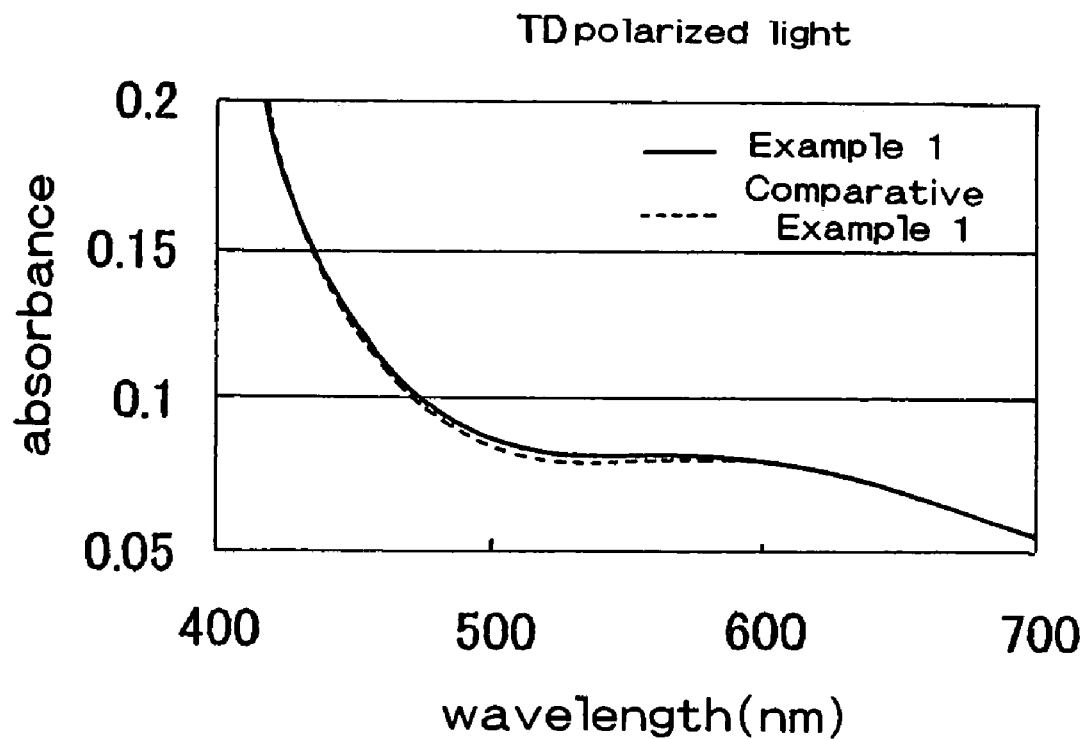
Figure 3A:
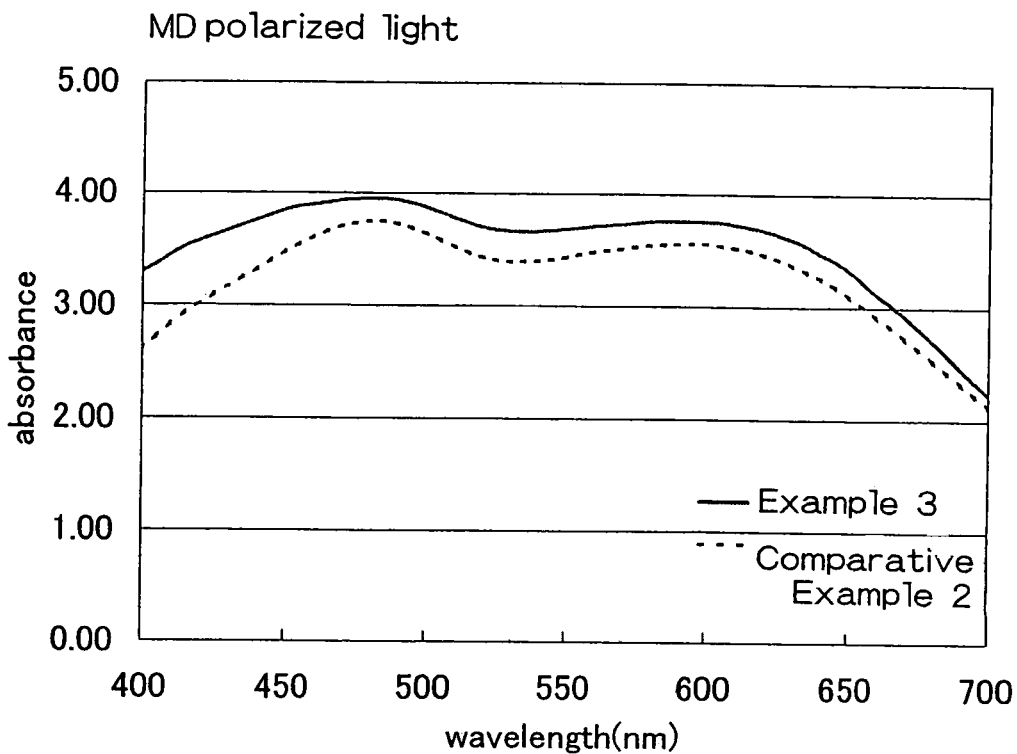
FIG. 3A and FIG. 3B are graphs showing polarized light absorption spectra of polarizers in Example 3 and Comparative example 2.
Figure 3B:
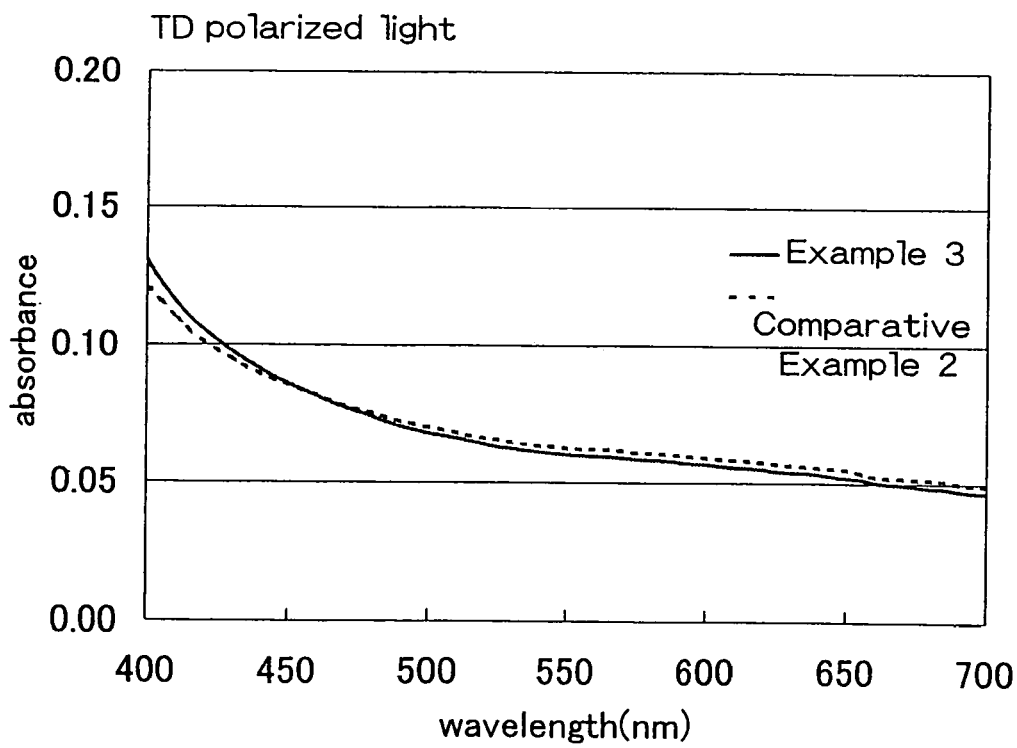

Furthermore, polarizers obtained in Example 1, Comparative example 1, Example 3, and Comparative example 2 were measured for a polarized light absorption spectrum using a spectrophotometer (manufactured by Hitachi Ltd. U-4100) with Glan Thompson prism. FIG. 2 shows polarized light absorption spectra of polarizers obtained in Example 1 and Comparative example 1. And FIG. 3 shows polarized light absorption spectra of polarizers obtained in Example 3 and Comparative example 2. "MD polarized lights" in FIG. 2 (a) and FIG. 3 (a) represent polarized light absorption spectra when a polarized light with a plane of vibration parallel to a stretching axis enters, and "TD polarized lights" in FIG. 2 (b) and FIG. 3 (b) represent polarized light absorption spectra when a polarized light with a plane of vibration perpendicular to a stretching axis enters.

In TD polarized lights (=transmission axis of polarizer), in visible range whole band, while absorbance of the polarizers in Example 1 and Comparative example 1 showed almost equal value, in MD polarized lights (=absorption of polarizer+scattering axis), absorbance in the polarizer of Example 1 exceeded absorbance of the polarizer in Comparative example 1 in shorter wavelength side. That is, the above-mentioned result shows that light polarizing performance of the polarizer in Example 1 exceeded performance of the polarizer in Comparative example 1 in a short wavelength side. Since all conditions, such as stretching and dyeing, are equivalent in Example 1 and Comparative example 1, it is thought that orientation of iodine based light absorbing materials is also equivalent. Therefore, as mentioned above, a rise of absorbance in MD polarized light of the polarizer of Example 1 shows that light polarizing performance improved by an effect caused by an effect of anisotropic scattering having been added to absorption by iodine. Also in polarizer obtained in Example 3, and polarizer obtained in Comparative example 2, it is shown, as in the above-mentioned results, that light polarizing performance of Example 3 improved as compared with Comparative example 2.

In haze values, a haze value to a linearly polarized light in a maximum transmittance direction, and a haze value to a linearly polarized light in an absorption direction (a perpendicular direction). Measurement of a haze value was performed according to JIS K7136 (how to obtain a haze of plastics-transparent material), using a haze meter (manufactured by Murakami Color Research Institute HM-150). A commercially available polarizing plate (NPF-SEG1224DU manufactured by NITTO DENKO CORP.: 43% of simple substance transmittances, 99.96% of polarization degree) was arranged on a plane of incident side of a measurement light of a sample, and stretching directions of the commercially available polarizing plate and the sample (polarizer) were made to perpendicularly intersect, and a haze value was measured. However, since quantity of light at the time of rectangular crossing is less than limitations of sensitivity of a detecting element when a light source of the commercially available haze meter is used, light by a halogen lamp which has high optical intensity provided separately was made to enter with a help of an optical fiber device, thereby quantity of light was set as inside of sensitivity of detection, and subsequently a shutter closing and opening motion was manually performed to obtain a haze value to be calculated.

In evaluation of unevenness, in a dark room, a sample (polarizer) was arranged on an upper surface of a backlight used for a liquid crystal display, furthermore, a commercially available polarizing plate (NPF-SEG1224DU by NITTO DENKO CORP.) was laminated as an analyzer so that a polarized light axis may intersect perpendicularly. And a level of the unevenness was visually observed on following criterion using the arrangement. X: a level in which unevenness may visually be recognized O: a level in which unevenness may not visually be recognized

TABLE 1

| | Transmittance of linearly polarized light (%) | | | | haze value (%) | | |
|---|---|---|---|---|---|---|---|
| | Maximum transmission direction ($k_1$) | Perpendicular direction ($k_2$) | Single substance transmittance (%) | Polarization degree (%) | Maximum transmission direction | Perpendicular direction | Unevenness |
| Example 1 | 82.80 | 1.40 | 42.10 | 96.70 | 2.7 | 47.0 | O |
| Comparative Example 1 | 83.00 | 1.65 | 42.30 | 96.10 | 0.4 | 0.3 | X |
| Example 2 | 84.20 | 1.20 | 42.70 | 97.20 | 1.9 | 54.1 | O |
| Example 3 | 87.00 | 0.035 | 43.52 | 99.92 | 1.8 | 61.0 | O |
| Example 4 | 86.50 | 0.087 | 43.29 | 99.80 | 4.2 | 70.5 | O |
| Comparative Example 2 | 87.00 | 0.043 | 43.52 | 99.90 | 0.3 | 0.2 | X |

In Examples 1 and 2 and Comparative example 1, although single substance transmittances are almost equal to each other, Examples 1 and 2 have higher polarization degrees, and demonstrate excellent polarized light characteristics, as shown in above-mentioned Table 1. Also in Examples 3 and 4 and Comparative example 2, although single substance transmittances are almost equal to each other, Examples 3 and 4 have higher polarization degrees, and demonstrate excellent polarized light characteristics.

Moreover, polarizers in Examples have a higher haze value of transmittance at the time of a rectangular crossing, and unevenness by variation is covered by scattering and cannot be recognized clearly as compared with the polarizer in Comparative examples.

Next, a triacetyl cellulose film (80 μm thickness) was adhered to both sides of polarizers in Examples and Comparative examples using a water-soluble adhesive, dried, and the adhered films were used as a polarizing plate. The obtained polarizing plate was exchanged for a polarizing plate on a backlight side of a commercially available twist nematic liquid crystal panel, and was mounted side by side. This was set in a state of black display in a dark room and level of unevenness was observed, and unevenness was not observed at all but very excellent visibility was confirmed as compared with polarizing plates prepared with polarizers in Comparative examples, when polarizing plates prepared with polarizers in Examples were mounted.

As a polarizer having a similar structure as a structure of a polarizer of this invention, a polarizer in which a mixed phase of a liquid crystalline birefringent material and an absorption dichroism material is dispersed in a resin matrix is disclosed in Japanese Patent Laid-Open No. 2002-207118, whose effect is similar as that of this invention. However, as compared with a case where an absorption dichroism material exists in dispersed phase as in Japanese Patent Laid-Open No. 2002-207118, since in a case where an absorption dichroism material exists in a matrix layer as in this invention a longer optical path length may be realized by which a scattered polarized light passes absorption layer, more scattered light may be absorbed. Therefore, this invention may demonstrate much higher effect of improvement in light polarizing performance. This invention may be realized with simple manufacturing process.

Although an optical system to which a dichroic dye is added to either of continuous phase or dispersed phase is disclosed in Japanese Patent Laid-Open No. 2000-506990, this invention has large special feature in a point of using not dichroic dye but iodine. The following advantages are realized when using not dichroic dye but iodine. (1) Absorption dichroism demonstrated with iodine is higher than by dichroic dye. Therefore, polarized light characteristics will also become higher if iodine is used for a polarizer obtained. (2) Iodine does not show absorption dichroism, before being added in a continuous phase (matrix phase), and after being dispersed in a matrix, an iodine based light absorbing material showing dichroism is formed by stretching. This point is different from a dichroic dye having dichroism before being added in a continuous phase. That is, iodine exists as iodine itself, when dispersed in a matrix. In this case, in general, iodine has a far effective diffusibility in a matrix compared with a dichroic dye. As a result, iodine based light absorbing material is dispersed to all corners of a film more excellently than dichroic dye. Therefore, an effect of increasing optical path length by scattering anisotropy can be utilized for maximum, which increases polarized light function.

A background of invention given in Japanese Patent Laid-Open No. 2000-506990 describes that optical property of a stretched film in which liquid droplets of a liquid crystal are arranged in a polymer matrix is indicated by Aphonin et al. However, Aphonin et al. has mentioned an optical film comprising a matrix phase and a dispersed phase (liquid crystal component), without using a dichroic dye, and since a liquid crystal component is not a liquid crystal polymer or a polymerized liquid crystal monomer, a liquid crystal component in the film concerned has a sensitive birefringence typically depending on temperatures. On the other hand, this invention provides a polarizer comprising a film having a structure where minute domains are dispersed in a matrix formed of a translucent water-soluble resin including an iodine based light absorbing material, furthermore, in a liquid crystalline material of this invention, in the case of a liquid crystal polymer, after it is orientated in a liquid crystal temperature range, cooled to room temperatures and thus orientation is fixed, in the case of a liquid crystal monomer, similarly, after orientation, the orientation is fixed by ultraviolet curing etc., birefringence of minute domains formed by a liquid crystalline material does not change by the change of temperatures.

What is claimed is:

1. A polarizer comprising a monolayer film comprising a continuous phase and a dispersed phase,
    wherein the continuous phase comprises a matrix formed of a translucent water-soluble resin including an iodine light absorbing material,
    wherein the dispersed phase comprises a minute domain dispersed in the matrix, and
    wherein an absorption axis of the iodine light absorbing material is oriented in a direction of an axis showing a maximum refractive index difference between the birefringent material forming the minute domain and the translucent water-soluble resin.

2. A polarizer comprising a monolayer film comprising a continuous phase and a dispersed phase,
    wherein the continuous phase comprises a matrix formed of a translucent water-soluble resin including an iodine light absorbing material,
    wherein the dispersed phase comprises a minute domain dispersed in the matrix, and
    wherein the minute domain is formed of an oriented birefringent material.

3. The polarizer according to claim 2, wherein the birefringent material shows liquid crystalline properties at least in an orientation processing step.

4. The polarizer according to claim 2, wherein the minute domain has 0.02 or more of birefringence.

5. The polarizer according to claim 2, wherein in a refractive index difference between the birefringent material forming the minute domain and the translucent water-soluble resin in each optical axis direction,
    a refractive index difference ($\Delta n^1$) in direction of axis showing a maximum is 0.03 or more, and
    a refractive index difference ($\Delta n^2$) between the $\Delta n^1$ direction and a direction of axes of two directions perpendicular to the $\Delta n^1$ direction is 50% or less of the $\Delta n^1$.

6. The polarizer according to claim 1, wherein the film is manufactured by stretching.

7. A polarizer comprising a monolayer film comprising a continuous phase and a dispersed phase,
    wherein the continuous phase comprises a matrix formed of a translucent water-soluble resin including an iodine light absorbing material,
    wherein the dispersed phase comprises a minute domain dispersed in the matrix, and
    wherein the minute domain has a length of 0.05 μm through 500 μm in a direction perpendicular to the direction of an axis showing a maximum refractive index difference between the birefringent material forming the minute domain and the translucent water-soluble resin.

8. The polarizer according to claim 1, wherein the iodine light absorbing material has an absorbing band at least in a band of 400 nm through 700 nm wavelength range.

9. A polarizer comprising a monolayer film comprising a continuous phase and a dispersed phase,
    wherein the continuous phase comprises a matrix formed of a translucent water-soluble resin including an iodine light absorbing material,
    wherein the dispersed phase comprises a minute domain dispersed in the matrix, and
    wherein a transmittance to a linearly polarized light in a transmission direction is 80% or more,
    a haze value is 5% or less, and
    a haze value to a linearly polarized light in an absorption direction is 30% or more.

10. A polarizing plate having a transparent protective layer formed at least on one side of the polarizer according to claim 1.

11. An optical film having at least one of the polarizer according to claim 1 or the polarizing plate according to claim 10.

12. An image display comprising at least one of the polarizer according to claim 1 or the polarizing plate according to claim 10.

13. An image display comprising the optical film according to claim 11.

14. A polarizer according to claim 1, wherein the minute domains are dispersed throughout the matrix.

15. A polarizer according to claim 1, wherein the iodine light absorbing material is dispersed throughout the matrix.

16. A polarizer according to claim 1, wherein the minute domains and the iodine light absorbing material are dispersed throughout the matrix.

* * * * *